(12) United States Patent
Penth et al.

(10) Patent No.: US 11,286,844 B2
(45) Date of Patent: Mar. 29, 2022

(54) VALVE ASSEMBLY FOR A CHARGING DEVICE

(71) Applicant: BORGWARNER INC., Auburn Hills, MI (US)

(72) Inventors: Jakob Penth, Saarbruecken (DE); Christoph Mueller, Kirchheimbolanden (DE); Christian Cossmann, Kaiserslautern (DE); Alexander Umlauff, Framersheim (DE); Werner Rott, Flonheim (DE); Florian Rapp, Kaiserslautern (DE); Georg Scholz, Woellstein (DE); Patrick Weber, Niederkirchen (DE)

(73) Assignee: Borg Warner Inc., Auburn Hills, MI (US)

( * ) Notice: Subject to any disclaimer, the term of this patent is extended or adjusted under 35 U.S.C. 154(b) by 0 days.

(21) Appl. No.: 17/054,412

(22) PCT Filed: May 17, 2019

(86) PCT No.: PCT/US2019/032801
§ 371 (c)(1),
(2) Date: Nov. 10, 2020

(87) PCT Pub. No.: WO2019/226475
PCT Pub. Date: Nov. 28, 2019

(65) Prior Publication Data
US 2021/0239036 A1 Aug. 5, 2021

(30) Foreign Application Priority Data
May 22, 2018 (DE) .......................... 102018207989.7

(51) Int. Cl.
*F02B 37/18* (2006.01)
*F01D 17/10* (2006.01)
(Continued)

(52) U.S. Cl.
CPC .......... *F02B 37/186* (2013.01); *F01D 17/105* (2013.01); *F16C 11/0623* (2013.01); *F16K 1/2007* (2013.01); *F05D 2220/40* (2013.01)

(58) Field of Classification Search
CPC .... F02B 37/186; F01D 17/105; F16K 1/2007; F16C 11/0623; F05D 2220/40
See application file for complete search history.

(56) References Cited

U.S. PATENT DOCUMENTS

2012/0292547 A1* 11/2012 Kierat ................... F02B 37/183
251/231
2015/0147162 A1* 5/2015 Stilgenbauer ......... F02B 37/183
415/145
2016/0348574 A1* 12/2016 Goeckelmann ......... F16K 51/00

FOREIGN PATENT DOCUMENTS

DE 102016212593 A1 1/2008
DE 102010007600 A1 8/2011
(Continued)

*Primary Examiner* — Audrey B. Walter
*Assistant Examiner* — Edward Bushard
(74) *Attorney, Agent, or Firm* — Howard & Howard Attorneys PLLC

(57) ABSTRACT

The invention relates to a valve assembly (10) for a charging device, in particular for a wastegate of an exhaust gas turbocharger, comprising a spindle (100), a lever arm (110) coupled to the spindle (100), and a valve unit (200). The lever arm (110) has a connecting element (112), designed as at least partially spherical, and the valve unit (200) has an accommodation region (212) with at least one first conical accommodation surface (214) in which the connecting element (112) is arranged.

17 Claims, 8 Drawing Sheets

(51) Int. Cl.
*F16C 11/06* (2006.01)
*F16K 1/20* (2006.01)

(56) References Cited

FOREIGN PATENT DOCUMENTS

| | | |
|---|---|---|
| DE | 112013002861 T5 | 2/2015 |
| DE | 102015209823 A1 | 12/2016 |
| DE | 202018100815 U1 | 4/2018 |
| EP | 2508730 A2 | 10/2012 |

* cited by examiner (A-A)

(B-B)

(A-A)

(C-C)

VALVE ASSEMBLY FOR A CHARGING DEVICE

CROSS-REFERENCE TO RELATED APPLICATIONS

The present application is the National Stage of International Patent Application No. PCT/US2019/032801 filed on May 17, 2019, which claims priority to and all the benefits of German Patent Application No. 102018207989.7 filed May 22, 2018, which applications are hereby expressly incorporated by reference in their entirety.

FIELD OF THE INVENTION

The present invention relates to a valve assembly for a charging device, a turbine with a corresponding valve assembly, and also a charging device.

BACKGROUND INFORMATION

Increasingly more vehicles of the more recent generation are equipped with charging devices. In order to achieve the target demands and the legal requirements for the vehicles, it is imperative to promote development in the complete drive train and also to optimize the individual components as well as the system as a whole with respect to their reliability and efficiency.

Single-stage and multi-stage, mostly two-stage, supercharging systems are used in the region of the system components for the engine and turbocharger. Valve assemblies are used both in single-stage and also in multi-stage charging devices, for example, to guide fluids (exhaust gases or fresh air) through a bypass channel or to seal the same. In single-stage charging systems, valve assemblies are used, for example, as wastegate valves in order to be able to adapt the operating range of the charging device to the changing operating ranges of the internal combustion engine. In certain operating states, it may thus be necessary to reduce and/or to control the drive energy acting on the compressor.

A two-stage charging device comprises, for example, two exhaust gas turbochargers (a larger, low-pressure EGT and a smaller, high-pressure EGT). At lower engine speeds, the high-pressure turbocharger guarantees a fast boost pressure and thus a dynamic start, whereas the large, low-pressure turbocharger is used at higher engine speeds and, as a low-pressure stage, is responsible for the high end efficiency. Bypasses, which are equipped with valve assemblies, thereby ensure an adjustment on the compressor- and on the turbine sides of the supercharging at the engine operating points.

In known valve assemblies, the valve flap is most often directly coupled to a shaft, which is mounted in a sleeve or directly on a housing. The high wear, which is caused by the high number of actuations, the large forces that occur, and the high temperatures caused in this area, are problematic in these types of valve arrangements. On the other hand, the sealing effect of these types of valve assemblies is most often not satisfactory due to the operating circumstances, for example, wear, depositions, and corrosion.

The goal of the present invention is correspondingly to provide an optimized valve assembly, which provides an improved wear behavior and an improved sealing effect.

BRIEF SUMMARY OF THE INVENTION

The present invention relates to a valve assembly for a charging device according to claim 1, a turbine arrangement according to claim 14, and a charging device according to claim 15.

The valve assembly according to the invention comprises a spindle, a lever arm coupled to the spindle, and a valve unit. The lever arm has a connecting element, designed as at least partially spherical, and the valve unit has an accommodation region with at least one first conical accommodation surface in which the connecting element is arranged.

In embodiments, the connecting element may be arranged in the accommodation region in such a way that a first linear contact is formed between a spherical surface of the connecting element and the first conical accommodation surface.

In embodiments, which are combinable with all previously described embodiments, the accommodation region may have a second conical accommodation surface. The connecting element may be arranged in the accommodation region in such a way that a second linear contact is formed between the spherical surface of the connecting element and the second conical accommodation surface. Corresponding linear contacts result in the connection region between spindle or lever arm and the valve unit due to the interplay of spherical connecting element and one or two conical accommodation surface in the accommodation region. The connection between spindle and valve unit may thus be configured virtually free of play. In addition, an optimized, central introduction of an actuator force from the spindle into the valve unit via the lever arm may be guaranteed due to the connection via the described linear contact. This also applies in the reverse direction in the transmission of exhaust gas forces acting on the valve disk. This leads to lower leakage and consequently to higher efficiency of the valve assembly or of the entire turbocharger.

Due to the embodiment according to the invention of the valve assembly, the connecting element may be coupled to the valve unit with no or only minimal play, such that, while a certain relative movement remains possible between spindle and valve disk, clapping or rattling noises may be suppressed as much as possible. This leads in turn, together with the concept of the linear contact(s), to lower wear and consequently to a higher robustness, as lower accelerations of the components toward each other occur and thus lower applications of force and lower frictional action occur at the contact regions between the spindle or connecting element and the valve unit.

In embodiments, which may be combined with all previously described embodiments, the connecting element, designed as at least partially spherical, may be designed as at least partially hollow. The weight of the valve assembly may be reduced due to this completely or partially hollow configuration. Due to the reduced weight, the accelerated masses are additionally lower, which leads in turn to reduced wear.

In embodiments, which may be combined with all previously described embodiments, the valve unit may have a valve disk and a cover, wherein the first conical accommodation surface is designed in the valve disk and, in case it is provided, the second conical accommodation surface is designed in the cover. The valve disk may have a projection and the first conical accommodation surface may be designed as a surface within the projection. The projection may have a cylindrical outer surface and may have a recess in a lateral wall, wherein the lever arm may be arranged at least partially in the recess.

Anti-rotation means may additionally be provided between the spindle or the lever arm and the valve unit. Due to the anti-rotation means, a rotation or tilting of the valve unit that is too strong relative to the spherical connecting element is suppressed in the accommodation region. For example, rotations/tilting between 0.1° to 5°, in particular between 0.5° to 3°, preferably between 1° and 2° may be permitted. All movements and movement directions, which the ball-cone connection allows between the spindle or lever arm and the valve unit, are thereby included under the expressions rotation or tilting.

The anti-rotation means may be designed as at least one stop. The connecting element, designed as at least partially spherical, may have a flattened portion on at least one side, preferably on two or three sides, said flattened portion(s) forming one stop or multiple stops together with an inner wall of the projection. Alternatively or additionally, the projection has a recess and the connecting element, designed as at least partially spherical, has an extension, wherein the extension is arranged in the recess and forms a stop together with corresponding lateral walls of the recess.

In embodiments, which are combinable with all previously described embodiments with a cover, the cover may have a cylindrical outer wall which comprises a recess, wherein the lever arm may be arranged at least partially in the recess.

In embodiments, which may be combined with all previously described embodiments with a cover, the cover may have a centrally-arranged through passage.

In embodiments, which may be combined with all previously described embodiments with a cover, the cover may be designed as a cast part. Alternatively, the cover may be designed as a sheet metal part, in particular wherein the cover has spring-elastic properties. A biasing may be exerted via the elastic cover on the connecting element, designed as at least partially spherical, and thus the relative movement due to gas pulsation may be reduced or suppressed. This reduces frictional work and thus wear. Likewise, potential wear, which occurs during operation, may be compensated by the elastic cover. The cover with spring-elastic properties may have a centrally-arranged through passage. In particular, the cover may have recesses, which define spring-elastic arms, wherein the arms extend radially inward from an edge of the cover in the direction of the through passage. In particular, three through eight arms may be provided. In one alternative embodiment of the cover with spring-elastic properties, a bottom of the cover may have a solid part and arms machined into the bottom, wherein the arms have spring-elastic properties. This design advantageously prevents negative effects in the case of a relaxation of the spring-elastic arms. Three through eight arms may be provided.

In embodiments, which may be combined with all previously described embodiments with a cover, the cover and the valve disk may be welded to each other, connected to each other via a press-fit connection, and/or caulked to each other.

In one alternative embodiment to the embodiment with a cover, the valve unit may have a valve disk and a closing element, wherein parts of the first, and if provided, second conical accommodation surfaces are arranged predominantly in the valve disk. One part of the first, and if provided, second conical accommodation surfaces may be designed in the closing element. The valve disk may have a projection, wherein the accommodation regions may be designed as a recess in the projection, and wherein the parts of the first and second conical accommodation surfaces may be designed predominantly as wall surfaces of the recess. The projection may have a through passage, wherein the closing element may be arranged in the through passage. The accommodation region may have an opening in the axial direction, wherein the lever arm may extend through the opening. The second accommodation surface may be the one which is arranged farther away from a sealing surface of the valve disk, and the part of the second accommodation surface arranged in the closing element may be designed so that it presses the connecting element into the first accommodation surface during joining.

In embodiments, which are combinable with all previously described embodiments with a closing element, the connecting element may have a flattened portion on a side facing the valve disk, said flattened portion forming a stop together with the valve disk. A tilting of the valve unit relative to the spindle or to the lever arm is limited by this configuration.

In embodiments, which may be combined with all previously described embodiments with a closing element, the closing element and the valve disk may be welded to each other, connected to each other via a press-fit connection, and/or caulked to each other. The closing element and the valve disk may also be screwed to each other.

In embodiments, which may be combined with all previously described embodiments, the spindle and the lever arm, or the lever arm and the connecting element, or the spindle, the lever arm, and the connecting element may be designed as one piece. Alternatively, the spindle and the lever arm may be designed as two separate components and configured in such a way that the valve assembly may be used opening to both the left and also to the right.

Another general advantage of the previously described embodiments of the valve assembly according to the invention consists in that the different components may be used in the same configuration for different applications. It may thus be provided that only the size of the valve disk is correspondingly adapted to smaller and larger valve assemblies or to turbines, in which the corresponding valve assemblies are provided. The remaining components may remain the same for the different applications. Development and production synergies thus develop which may significantly reduce costs.

The invention additionally comprises a turbine arrangement for a charging device with at least one turbine housing, a turbine wheel arranged in the turbine housing, and a valve assembly according to any one of the previously described embodiments.

In embodiments of the turbine arrangement, the spindle may be arranged in a through passage in the turbine housing. In particular, a sleeve may be provided between the spindle and the turbine housing for mounting the spindle.

In embodiments of the turbine arrangement, the valve assembly may be a wastegate assembly. Alternatively, the valve assembly may be part of a bypass assembly.

The invention additionally comprises a charging device for an internal combustion engine with a turbine arrangement according to any one of the preceding embodiments.

Additional details and features of the invention are described by way of the following figures.

BRIEF DESCRIPTION OF THE DRAWINGS

FIG. 5a shows isometric views of four embodiments for covers for additional embodiments of the valve assembly according to the invention;

FIG. 5b shows a sectional view of an embodiment of the valve assembly according to the invention with a cover from FIG. 5a;

FIG. 5c shows an isometric view of another embodiment of the valve assembly according to the invention with another cover from FIG. 5a;

FIG. 5d shows a sectional view of an embodiment of the valve assembly according to the invention from FIG. 5c;

FIG. 10a shows an isometric view of a two-part spindle-lever arm design according to a first embodiment;

FIG. 10b shows a partial sectional view of the two-part spindle-lever arm design from FIG. 10a;

FIG. 11a shows an isometric view of a two-part spindle-lever arm design according to a second embodiment;

FIG. 11b shows a partial sectional view of the two-part spindle-lever arm design from FIG. 11a;

DETAILED DESCRIPTION OF THE INVENTION

In the following, embodiments of the valve assembly 10 according to the invention and the turbine according to the invention and the charging device according to the invention are described by way of the figures.

Figure 1:
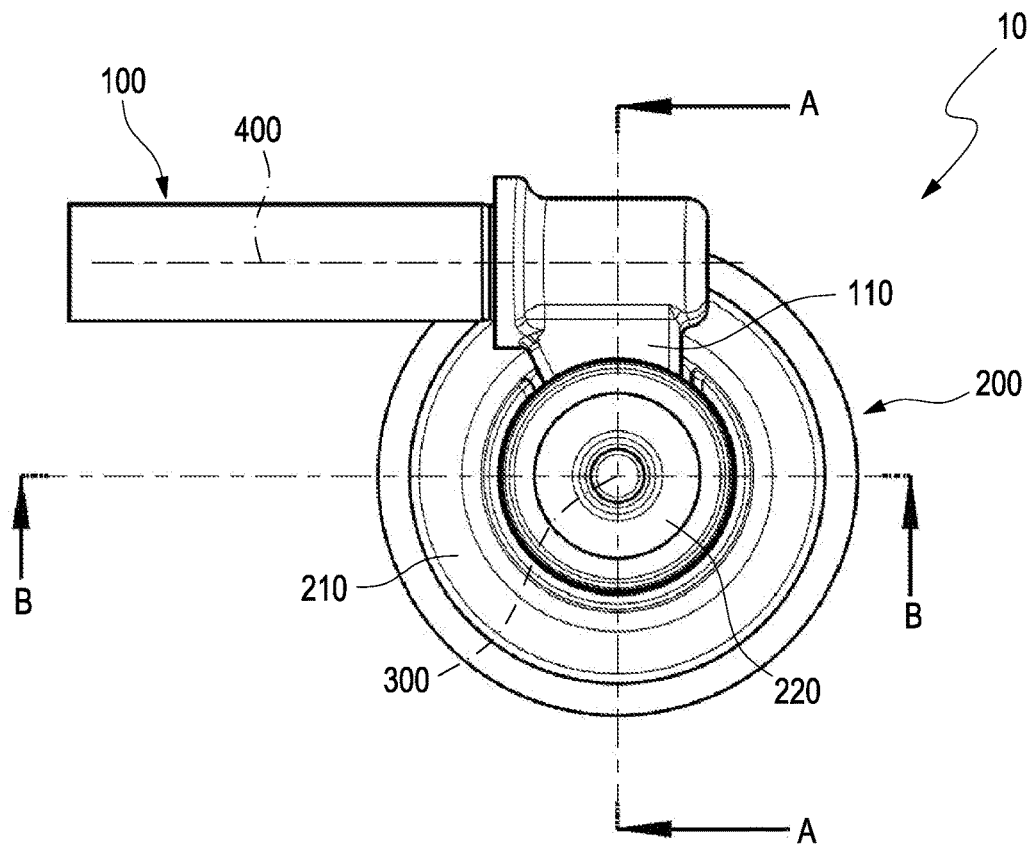
FIG. 1 shows a top view of the valve assembly according to the invention according to a first embodiment.

In general, and thus referring to all FIGS. 1 through 9, see, for example, FIG. 1, valve assembly 10 according to the invention comprises a spindle 100, a lever arm 110 coupled to spindle 100, and a valve unit 200. As is depicted, for example, in FIG. 2, lever arm 110 has connecting element 112, designed as at least partially spherical. An accommodation region 212 of valve unit 200 with at least one first conical accommodation surface 214 is likewise shown in FIG. 2. Connecting element 112 is arranged in accommodation region 212. Valve assembly 10 according to the invention may be used, for example, in a wastegate for a turbine of a single-stage charging device or in a bypass arrangement of a turbine for a multi-stage charging device.

Connecting element 112 is arranged in accommodation region 212 in such a way that a first linear contact is formed between its spherical surface and first conical accommodation surface 214. Embodiments are shown in FIGS. 1 through 9, in which accommodation region 212 additionally has a second conical accommodation surface 216. Connecting element 112 is arranged in accommodation region 212 in such a way that a second linear contact is formed between the spherical surface of connecting element 112 and second conical accommodation surface 216. Due to the interplay of spherical connecting element 112 and one or two conical accommodation surfaces 214, 216 in accommodation region 212, corresponding linear contacts result in the connection region between spindle 100 or lever arm 110 and valve unit 200. The connection between spindle 100 and valve unit 200 may thus be configured virtually free of play. In addition, an optimized, central introduction of an actuator force from spindle 100 into valve unit 200 via lever arm 110 may be guaranteed due to the connection via the described linear contact. This also applies in the reverse direction in the transmission of exhaust gas forces acting on valve disk 210. This leads to lower leakage and consequently to higher efficiency of valve assembly 10 or of the entire turbocharger in which a corresponding valve assembly 10 is provided.

Due to the configuration according to the invention of valve assembly 10, connecting element 112 may be coupled to valve unit 200 with no or only minimal play, such that, while a certain relative movement remains possible between spindle 100 and valve disk 210, clapping or rattling noises may be suppressed as much as possible. This leads in turn, together with the design of the linear contact(s), to lower wear and consequently to a higher robustness of valve assembly 10, as lower accelerations of the components toward each other occur and thus lower applications of force and lower friction work occur at the contact regions between spindle 100 or connecting element 112 and valve unit 200.

The spherically designed regions of connecting element 112 have spherical surfaces, which describe, for example, a sphere with a diameter between 10 mm and 30 mm, in particular between 15 mm and 25 mm, for example, 20 mm. A large contact area, on which valve element 200 may contact connecting element 112, is produced by the relatively large spherical surface, by which means a relatively low wear arises.

As is depicted in FIGS. 2 through 5, and also 5b and 5d, connecting element 112, designed as at least partially spherical, may be designed as at least partially hollow. The weight of valve assembly 200 may be reduced due to this completely or partially hollow configuration. Due to the reduced weight, the accelerated masses are additionally lower, which leads in turn to reduced wear. Partially hollow, spherical connecting element 112 may be configured particularly preferably as C-shaped, see FIG. 5d. This means that connecting element 112 has not only one through passage, as is shown for example in FIG. 2, but is also laterally open transversely to such a through passage. Connecting element 112 has a certain flexibility due to this configuration, by means of which thermal warpage and distortions may be prevented, in particular at high temperatures.

With reference to FIGS. 1 through 5, valve unit 200 has a valve disk 210 and a cover 220, wherein first conical accommodation surface 214 is designed in valve disk 210 and second conical accommodation surface 216 is designed in cover 220. Valve disk 210 has a sealing surface 218 on a first side, which interacts in use with a corresponding valve seat in order, for example, to block a wastegate channel (see, e.g., FIG. 2, which shows valve disk 210 in the closed state on a valve seat). Sealing surface 218 is configured in particular as disk shaped or annular.

As is to be understood from FIGS. 2 through 5, first conical accommodation surface 214 is designed on the side of valve disk 210 lying opposite sealing surface 218. Valve disk 210 has a projection 211 in this region. First conical accommodation surface 214 is designed as a surface within projection 211. In other words, conical accommodation surface 214 is designed as a recess in projection 211. In particular, projection 211 extends centrally from valve disk 210. Projection 211 may have a cylindrical outer surface. In the examples of FIGS. 1 through 5, see, e.g., FIGS. 2 and 4, projection 211 has a recess 211a in a lateral wall. Lever arm 110 is arranged at least partially in recess 211a.

Lever arm 110 with spherical connecting element 112 arranged thereon thus engages laterally through recess 211*a* into accommodation region 212 of valve unit 200.

In addition, anti-rotation means may be provided between spindle 100 or lever arm 110 and valve unit 200. Due to the anti-rotation means, a rotation or tilting of valve unit 200 that is too strong relative to spherical connecting element 112 is suppressed in the accommodation region 212. For example, rotations/tilting between 0.1° to 5°, in particular between 0.5° to 3°, preferably between 1° and 2° may be permitted. All movements and movement directions, which the ball-cone connection allows between spindle 100 or lever arm 110 and the valve unit, are thereby included under the expressions rotation or tilting, wherein the angle ranges apply from a zero position in the respective directions.

Figure 2:
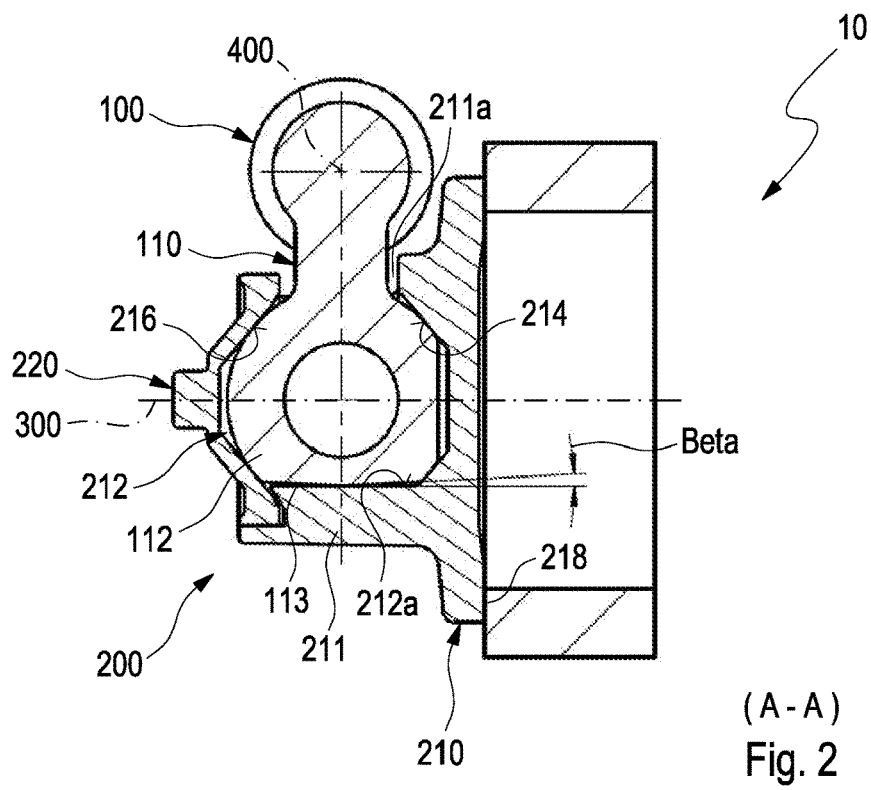
FIG. 2 shows a first sectional view of the valve assembly according to the invention from FIG. 1.
Figure 3:
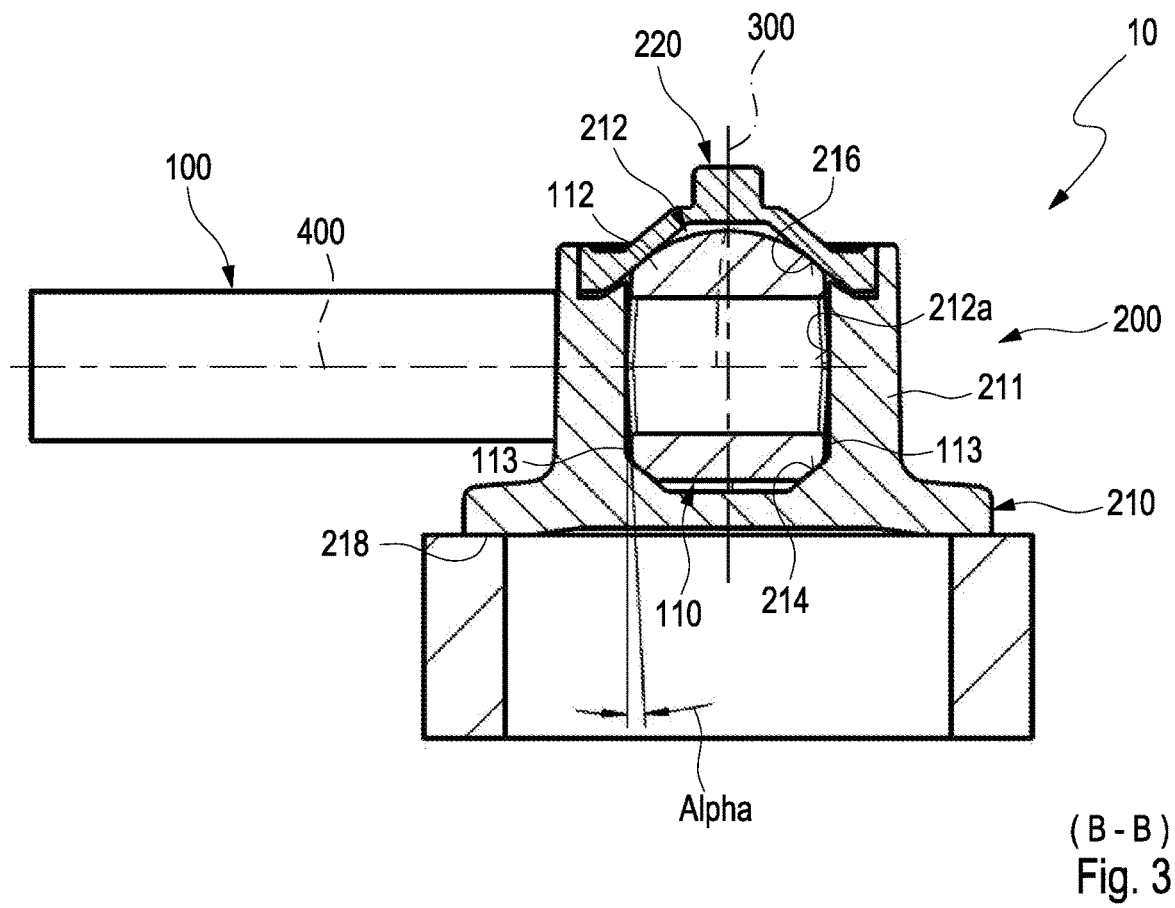
FIG. 3 shows a second sectional view of the valve assembly according to the invention from FIG. 1.
Figure 5:
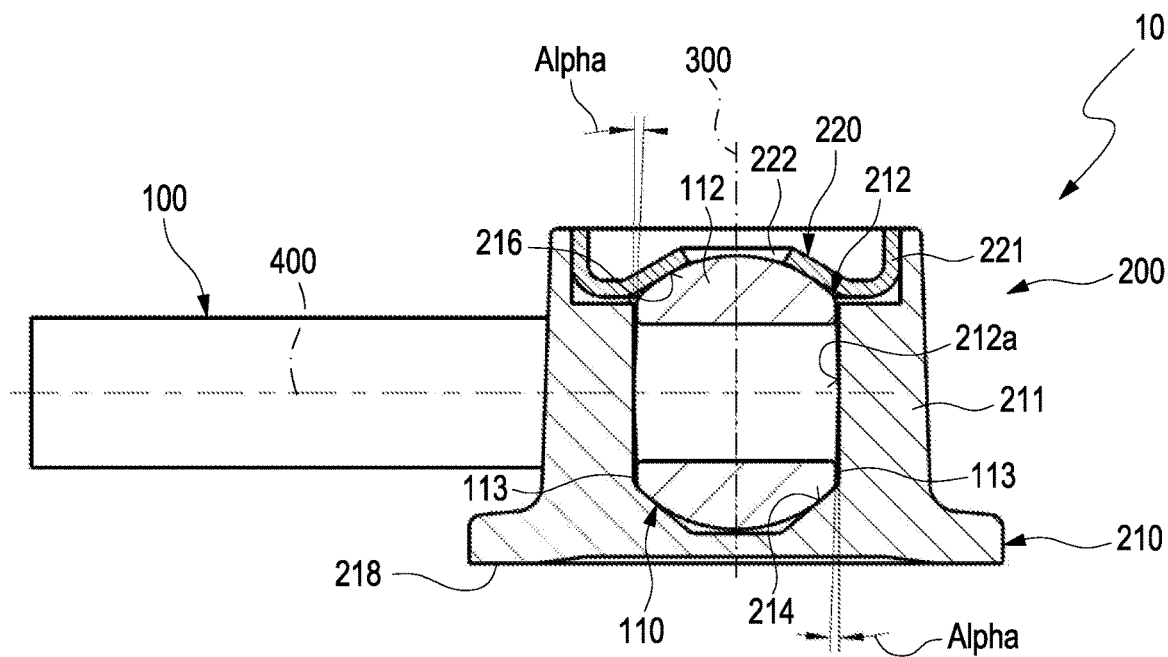
FIG. 5 shows a sectional view of the [valve assembly] according to the invention according to a third embodiment.
Figure 5:
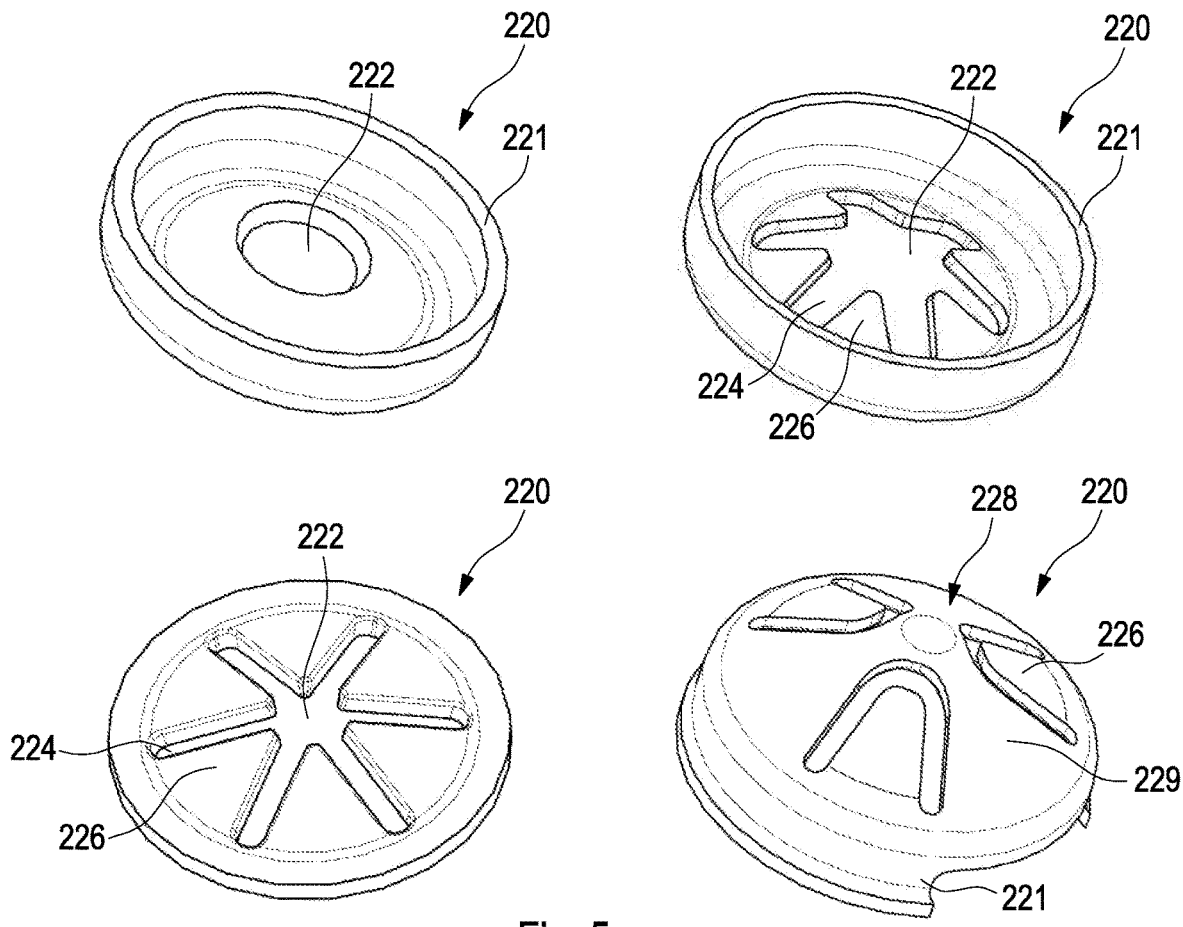
Figure 5:
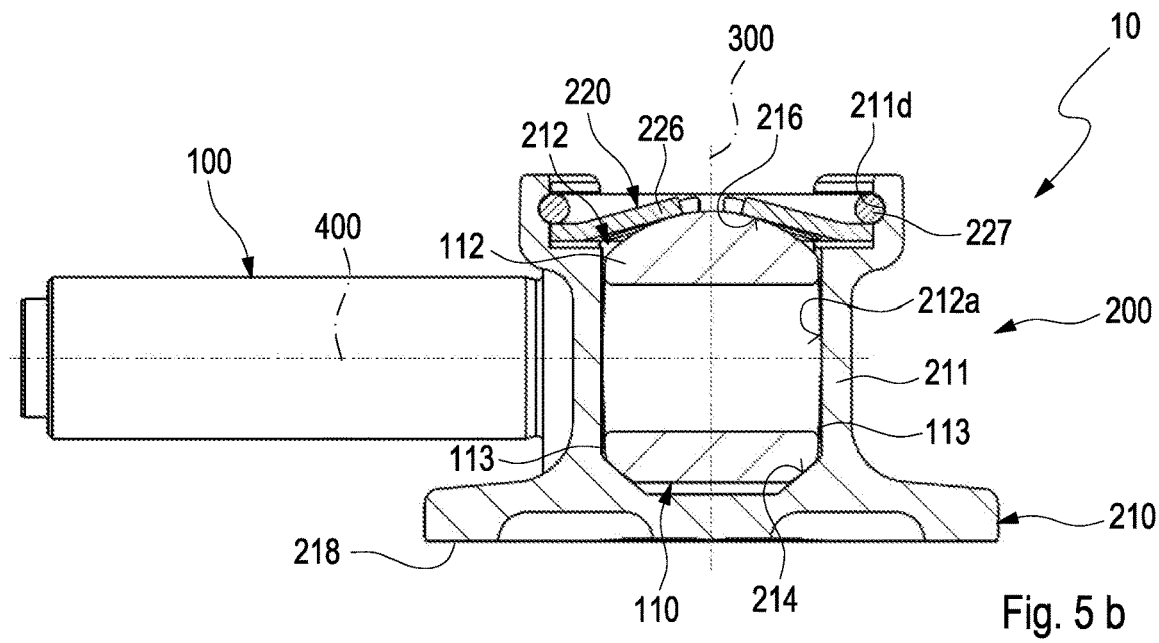
Figure 5:
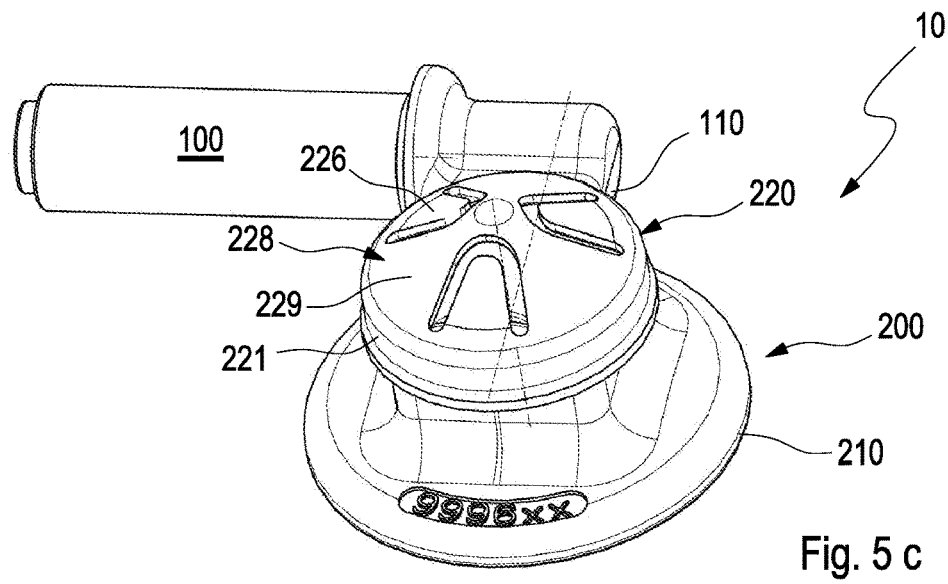
Figure 5:
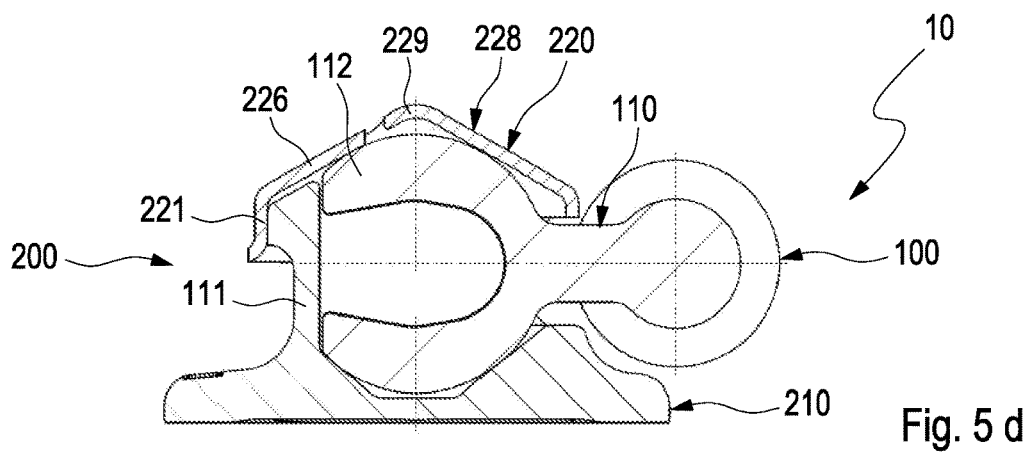

The anti-rotation means may be designed as at least one stop. With regard to this, FIGS. 2, 3, and 5 show embodiments in which connecting element 112, designed as at least partially spherical, has a flattened portion 113 on three sides respectively, which, together with an inner wall 212*a* of projection 211, form corresponding stops. In alternative embodiments, only one or two flattened portions may be provided which form the corresponding stops with inner wall 212*a*. In the examples from FIGS. 2, 3, and 5, a first flattened portion 113 is arranged opposite lever arm 110. The other two flattened portions 113 are arranged approximately at 90° angles from the first flattened portion. Inner wall 212*a* of projection 211 has a correspondingly straight wall region axially above conical accommodation surface 214 in these areas. As is likewise depicted in FIGS. 2, 3, and 5, flattened portions 113 of connecting element 112, designed at least partially as spherical, may thereby have draft angles. In other words, flattened portions 113 may depict straight areas which, starting from the center of connecting element 112, may be arranged inclined at an angle alpha or beta to axis 300 or to a plane/surface which extends parallel to axis 300.

Figure 4:
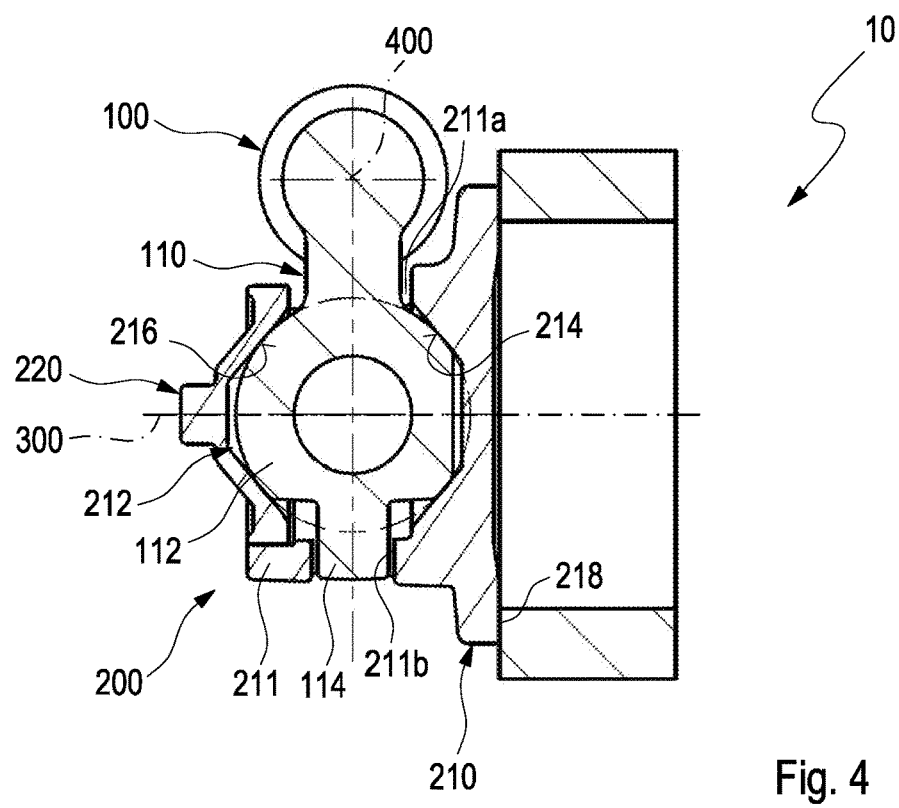
FIG. 4 shows a sectional view of the [valve assembly] according to the invention according to a second embodiment.

FIG. 4 shows an embodiment, in which projection 211 has a recess 211*b* and in which connecting element 112, designed at least partially as spherical, comprises an extension 114. Extension 114 is arranged in recess 211*b* and forms a stop together with corresponding lateral walls of recess 211*b*. Recess 211*b* may, for example, be designed as a through passage or as a non-continuous recess. This type of stop may be provided alternatively or also in addition to the stops formed via flattened portions 213.

Projection 211 in the embodiments from FIGS. 1 through 5 is dimensioned in such a way that it extends past lever arm 110 along axis 300. The entire height of lever arm 110 is thus arranged in recess 211*a*. Alternatively, the projection may also be configured as smaller and cover 220 may therefore be correspondingly larger with respect to the axial extension along axis 300. Cover 220 then has a cylindrical outer wall which comprises a recess, wherein lever arm 110 is arranged at least partially in the recess (not shown in the figures).

In the embodiment of FIG. 5, cover 220 additionally has a centrally-arranged through passage 222.

Cover 220 may be designed as a cast part, as in the examples from FIGS. 1 through 4. Alternatively, cover 220 may be designed as a sheet metal part, see to FIG. 5 through FIG. 5*d*. In this case, cover 220 may have, in particular, spring-elastic properties. A biasing may be exerted via elastic cover 220 on connecting element 112, designed as at least partially spherical, and thus the relative movement due to gas pulsation may be reduced or suppressed. This reduces friction work and thus wear. Likewise, potential wear, which occurs during operation, may be compensated by elastic cover 220. In this embodiment, cover 220 may be, for example, manufactured as a stamped/deep-drawn part, for example, made from spring steel.

FIG. 5*a* shows different embodiments of a cover 220 with spring-elastic properties. In a first embodiment, cover 220 is configured as annular with a centrally-arranged through passage 222. This embodiment corresponds to cover 220 from FIG. 5. A second embodiment of the cover has slots or recesses 224, which are distributed across the periphery of through passage 222 and define spring-elastic arms 226. Arms 226 thus extend radially inward from an edge of cover 220 up to through passage 222. For example, three through eight arms 226 may be provided. In particular, for example, six arms 226 may be provided. The configuration of cover 220 with arms 226 improves the spring-elastic properties of cover 220. The first and second embodiments additionally have a collar 221 aligned in the axial direction with respect to axis 300. In the assembled state, collar 221 contacts the inner wall of projection 211, see, e.g., FIG. 5, and may, for example, be welded to the same from above.

The third embodiment of cover 220 depicted in FIG. 5*a* has a central through passage 222 with spring-elastic arms 226 arranged around the same. However, in contrast to the first and second embodiment, cover 220 of the third embodiment is not configured as a spring plate. This means that cover 220 does not have a collar 221. As is depicted in FIG. 5*b*, cover 220 in the form of a spring plate is fixed in projection 211 via a snap ring 227. Projection 211 has a corresponding groove 211*d* on its inner side for this purpose.

The fourth embodiment of cover 220 depicted in FIG. 5*a* has no central through passage. The bottom 228 of cover 220 has a solid part 229 into which spring-elastic arms 226 are machined. Solid part 229 thereby also extends over the center of cover 220. For example, 3 through 8 arms may again be provided. Arms 226 may, for example, be stamped or cut into bottom 228. Prior to assembly, arms 226 are bent inward/downward in order to thereby apply a biasing force on connecting element 112 during assembly. This function will be described in greater detail with reference to FIGS. 5*c* and 5*d*. FIGS. 5*c* and 5*d* show an isometric view of previously described cover 220 and a sectional view during assembly. This means, cover 220 is not yet located in its final position. As is clear, arms 226 are already in contact with connecting element 112, as they are designed as bent inward (see left side in the image of FIG. 5*d*). In contrast, solid part 229 of bottom 228 is not yet in contact with connecting element 112 (however, the narrow gap, which is still present on the right side between bottom 228 of cover 220 and connecting element 112, is not visible in FIG. 5*d*). During assembly, a corresponding biasing force is then applied until arms 226 are aligned even with bottom 228 and both arms 226 and also solid part 229 of bottom 228 are in contact with connecting element 112. This means, a linear contact is formed again between cover 220 and connecting element 112. Subsequently, an additional force may also be applied in order to bias the entire cover 220, including arms 226 and solid part 229 of bottom 228, against connecting element 112. This embodiment of cover 220 has the advantage that, in the case of a relaxation of spring-elastic arms 226 over the course of time (for example, due to temperature influences), a gap does not occur between cover 220 and connecting element 112, as solid part 229 of bottom 228 also contacts connecting element 112. Thus, a biasing is continuously maintained between cover 220 and connecting element 112 and noise is prevented.

In contrast to the first and second embodiment of FIG. 5*a*, the size and shape of cover 220 of the fourth embodiment is configured in such a way that collar 221 surrounds projection 211 on the outside (see FIGS. 5c and 5d). Corresponding to the first and second embodiment, cover 220 may be welded to projection 211 along collar 221.

As already mentioned, cover 220 and valve disk 210 may be welded to each other. Alternatively, cover 220 and valve disk 210 may be connected to each other via a press-fit connection and/or caulked to each other. Cover 220 and valve disk 210 may, for example, be connected to each other in a connection region, for example, in the region of projection 211, by laser welding.

FIGS. 6 through 9 show another embodiment of valve assembly 10 according to the invention, wherein valve unit 200 has a valve disk 210 and a closing element 230. In this embodiment, parts of first and second conical accommodation surface 214, 216 are predominantly designed in valve disk 210. One part of the first and second conical accommodation surface 214, 216 is additionally designed in the closing element 230 (see, e.g., FIG. 7). Valve plate 210 again has a projection 211, wherein accommodation region 212 is designed as a recess in projection 211, see, for example, FIG. 8. The majority of parts of first and second conical accommodation surface 214, 216 are designed as wall surfaces of the recess. Accommodation surfaces 214, 216 are thus arranged in the interior of projection 211.

Figure 6:
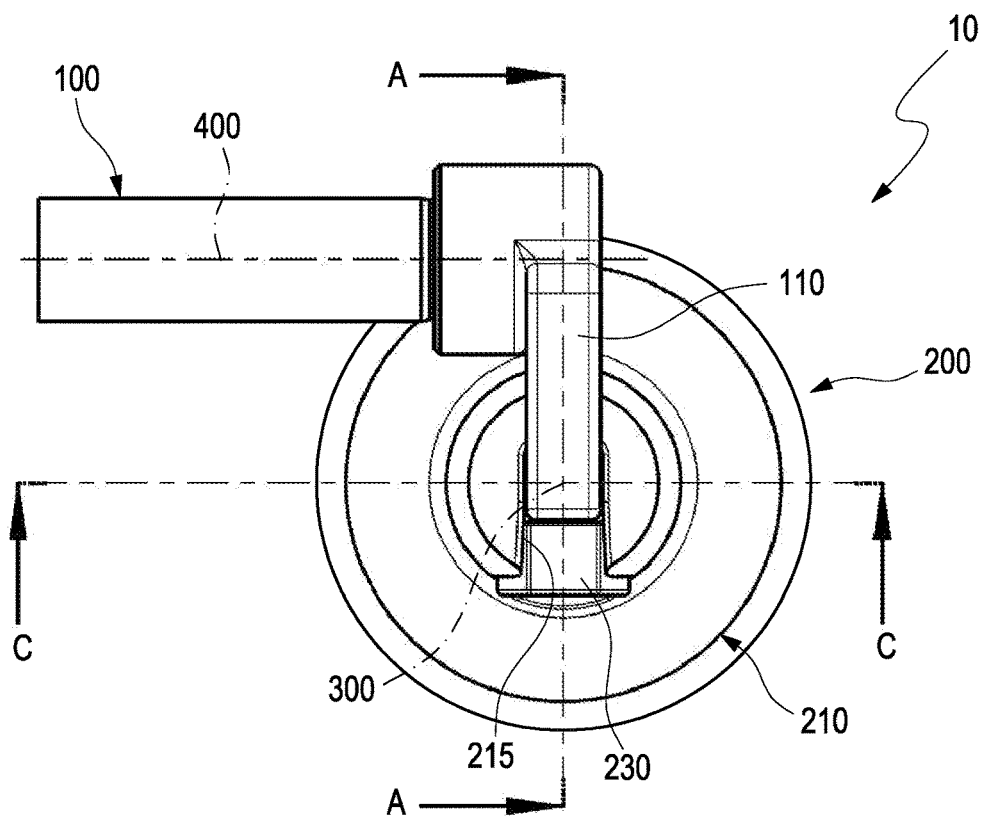
FIG. 6 shows a top view of the valve assembly according to the invention according to a fourth embodiment.
Figure 9:
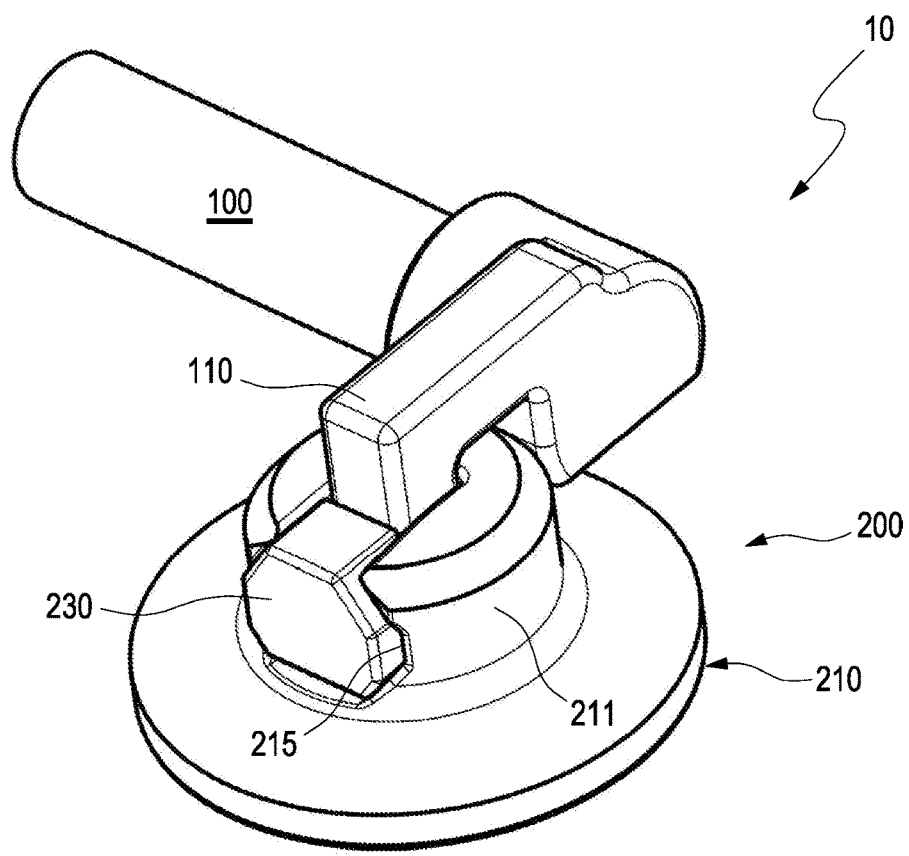
FIG. 9 shows an isometric view of the valve assembly according to the invention from FIG. 6.

Projection 211 has a through passage 215, wherein closing element 230 is arranged in through passage 215 (see FIGS. 6 and 9). As shown, through passage 215 may, for example, be arranged laterally, thus approximately at a 90° angle to axis 300 of valve plate 210. However, in other embodiments resulting from the design, through passage 215 may also be in any other logical angle to axis 300.

Figure 7:
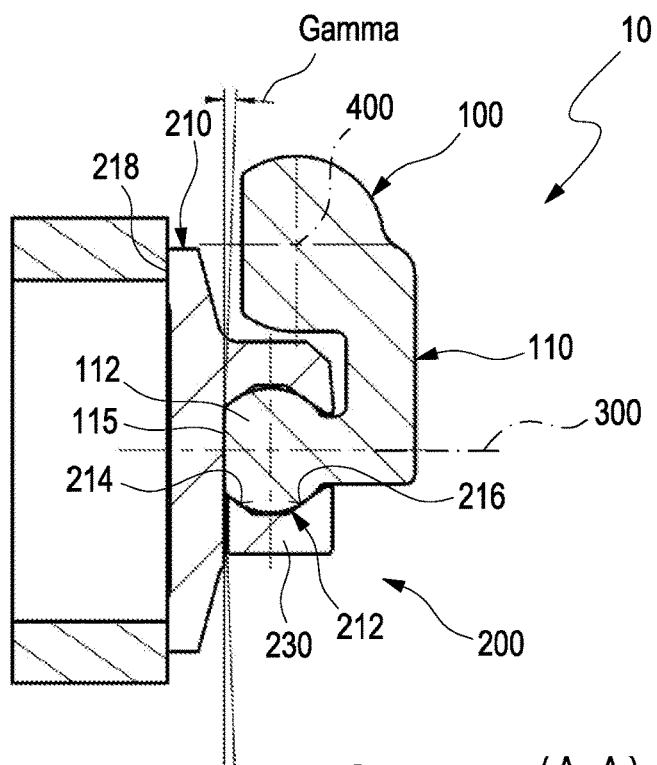
FIG. 7 shows a first sectional view of the valve assembly according to the invention from FIG. 6.
Figure 8:
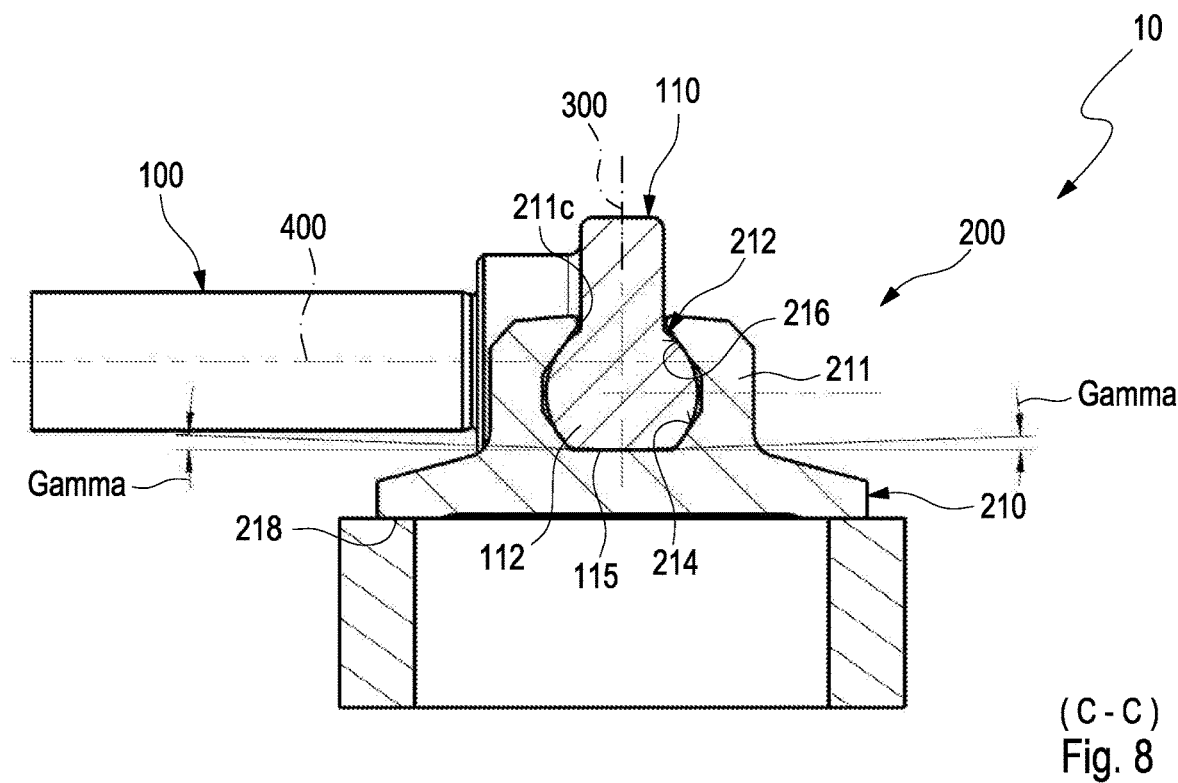
FIG. 8 shows a second sectional view of the valve assembly according to the invention from FIG. 6.

Accommodation region 212 additionally has an opening 211c in the axial direction (see FIG. 8). Lever arm 110 extends through opening 211c. The axial direction relates to axis 300 of valve unit 200. Axis 300 extends in such a way that sealing surface 218 of valve disk 210 is arranged substantially perpendicular to axis 300. Opening 211c is arranged on a side of valve disk 210 or projection 211 opposite sealing surface 218. Lever arm 110 with spherical connecting element 112 arranged thereon thus engages from above into accommodation region 212 of valve unit 200 in this embodiment (see also FIGS. 7 and 9). During assembly, lever arm 110 with connecting element 112 is pushed from the side through through passage 215 into the accommodation region so that the spherical surface of connecting element 112 contacts conical accommodation surfaces 214, 216 and lever arm 110 extends through opening 211c upward in the axial direction away from valve disk 210. Through passage 215 is subsequently closed with closing element 230, which likewise has conical surfaces on its inner side corresponding to first and second accommodation surfaces 214, 216 so that spherical connecting element 112 is surrounded in total by a double cone. As is clear in the example from FIG. 7, second accommodation surface 216 is the one which is arranged farther away than first accommodation surface 214 from a sealing surface 218 of valve disk 210. The part of second accommodation surface 216 arranged in closing element 230 may thereby be designed in particular so that it presses connecting element 112 into first accommodation surface 214 during joining, thus during the connection of closing element 230 to valve disk 210.

As is shown in FIGS. 7 and 8, connecting element 112 may have a flattened portion 115 on a side facing toward valve disk 210, said flattened portion forming a stop together with valve disk 210. Due to this embodiment, a tilting of valve unit 200 relative to spindle 100 or to lever arm 110 is again limited. As in the first embodiment, the flattened portion may be arranged at an angle starting from the center of connecting element 112. In this case, at an angle gamma relative to axis 400 of spindle 100 or relative to a plane/surface which lies parallel to axis 400 (see FIG. 8).

Closing element 230 and valve disk 210 may be welded to each other, connected to each other via a press-fit connection and/or caulked to each other. For example, closing element 230 and valve disk 210 may be connected to each other by laser welding. Alternatively or additionally, closing element 230 and valve disk 210 may also be screwed to each other.

Spindle 100 and lever arm 110, or lever arm 110 and connecting element 112, or spindle 100, lever arm 110 and connecting element 112 may be configured as one piece, which also applies to all previously described embodiments. For example, the integral element, which unites spindle 100, lever arm 110, and connecting element 112, may be a cast element which is subsequently processed (machined or surface-treated in another manner) in corresponding areas (e.g. parts of connecting element 112, bearing area of spindle 100).

Figure 10:
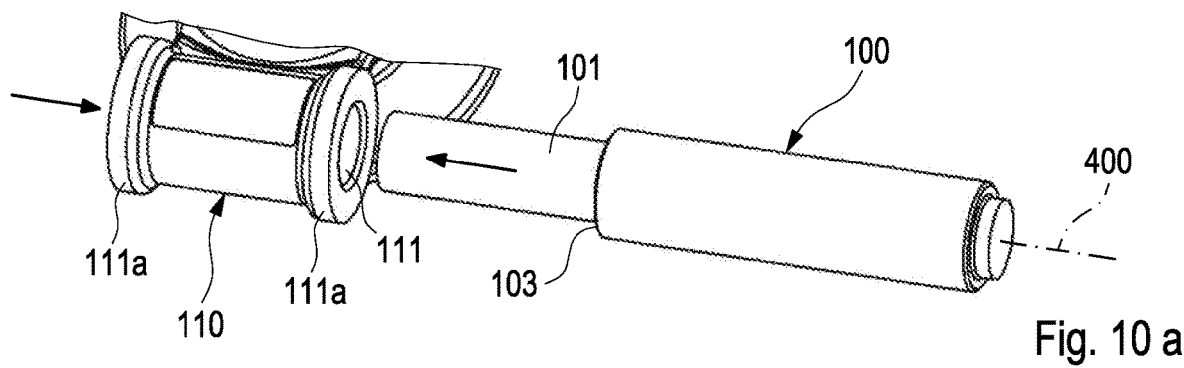
Figure 10:
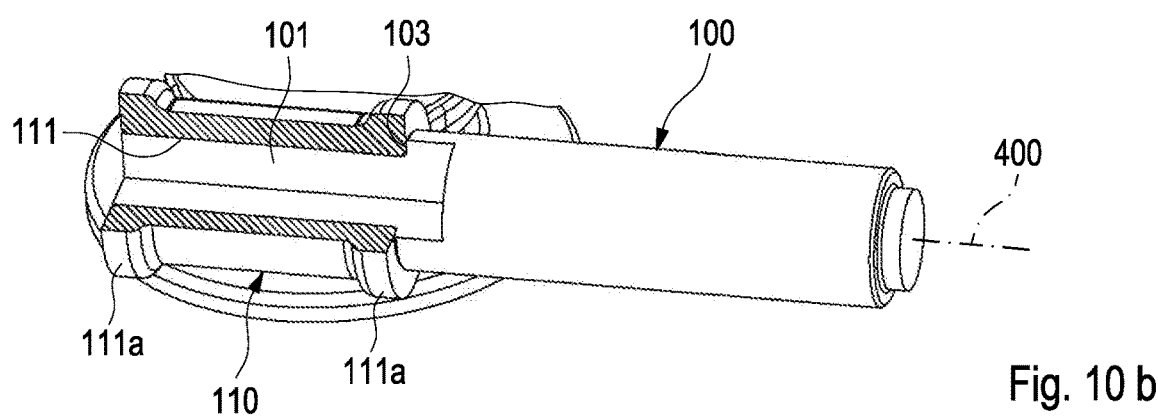

Lever arm 110 and spindle 100 may also be configured as two separate components to be connected to one another. Reference is made to FIGS. 10a through 11b with regard to this. FIGS. 10a through 11b show two possible embodiments of a two-part spindle-lever arm design. The two embodiments are combinable with all preceding valve assemblies 10, for which reason lever arm 110 is depicted in truncated form and only the connection with spindle 100 is described in greater detail. In the example depicted in FIGS. 10a and 10b, a cylindrical receptacle 111 is provided in the section of lever arm 110 that accommodates spindle 100, wherein lever arm 110 has a shoulder 111a on at least one end region of recess 111. Spindle 100 has a region 101 of reduced diameter, which in the assembled state is arranged in cylindrical receptacle 111. As is clear in FIG. 10b, step 103, formed on the end of region 101 of reduced diameter, contacts shoulder 111a of lever arm 110 in the assembled state. Receptacle 111 advantageously completely penetrates lever arm 110. In this case, and when shoulders 111a are provided on both ends of the receptacle, as is shown in FIGS. 10a and 10b, spindle 100 may be inserted from both sides into receptacle 111 of lever arm 110. This possibility is indicated in FIG. 10a by the two arrows. Due to this type of design, the advantage results that the same component combination made of spindle 100 and lever arm 110 may be used for valve assemblies 10 opening both to the left and also to the right. This means, the same components may be used, for example, for different turbine designs. Costs may be saved by this means.

Figure 11:
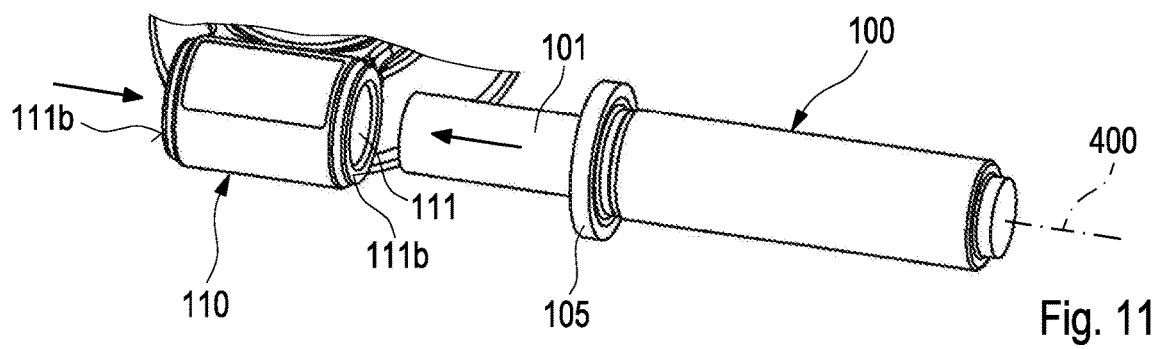
Figure 11:
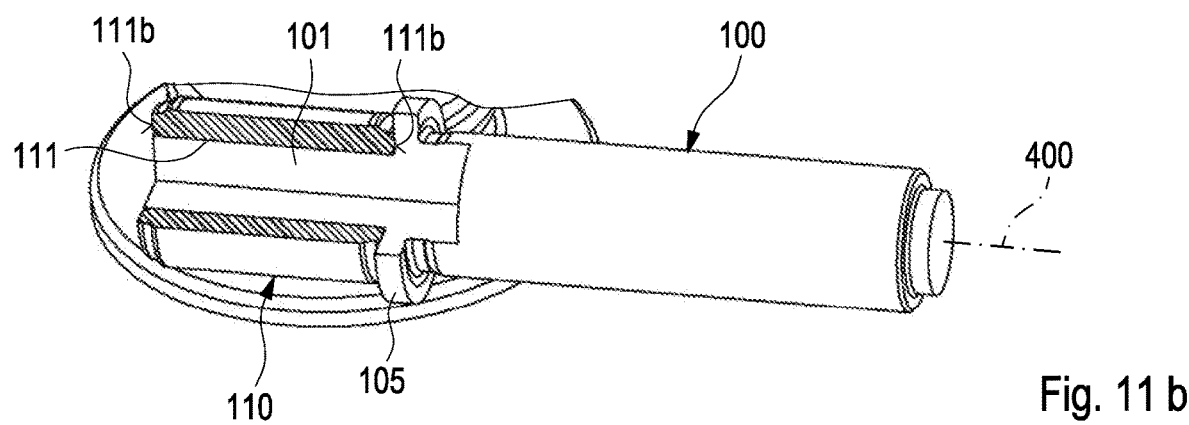

The embodiment of the spindle-lever arm design depicted in FIGS. 11a and 11b has the same advantages as the design from FIGS. 10a and 10b. The difference in the two embodiments consists in that spindle 100 has a shoulder 105 instead of lever arm 110. The shoulder may be arranged at an innermost end of a region 101 of reduced diameter of spindle 100, as depicted in FIGS. 11a and 11b. However a region 101 of reduced diameter is not mandatory in the embodiment from FIGS. 11a and 11b. This means, spindle 100 may also have an identical diameter on both sides of shoulder 105. Undercuts, as also depicted in FIGS. 11a and 11b, may also be provided in both variants. Shoulder 105 contacts a corresponding contact surface 111b of lever arm 110 in the assembled state. As in the embodiment from FIGS. 10a and 10b, receptacle 111 may also extend in this case through the entirety of lever arm 110 and corresponding contact surfaces 111b may be provided on both ends of receptacle 111 so that the spindle-lever arm design may again be used for valve assemblies 10 that open both on the left and also on the right. It is applicable for both embodiments shown in FIGS. 10a through 11b that, in the case of the two-part embodiment, spindle 100 and lever arm 110 may be, for example, welded to each other for a rigid connection after assembly.

Another general advantage of the previously described embodiments of valve assembly 10 according to the invention consists in that the different components may be used in the same configuration for different applications. It may thus be provided that only the size of valve disk 210 is correspondingly adapted to smaller and larger valve assemblies 10 or to turbines, in which corresponding valve assemblies 10 are provided. The remaining components may remain the same for the different applications. Development and production synergies thus develop which may significantly reduce costs.

Figure 12:
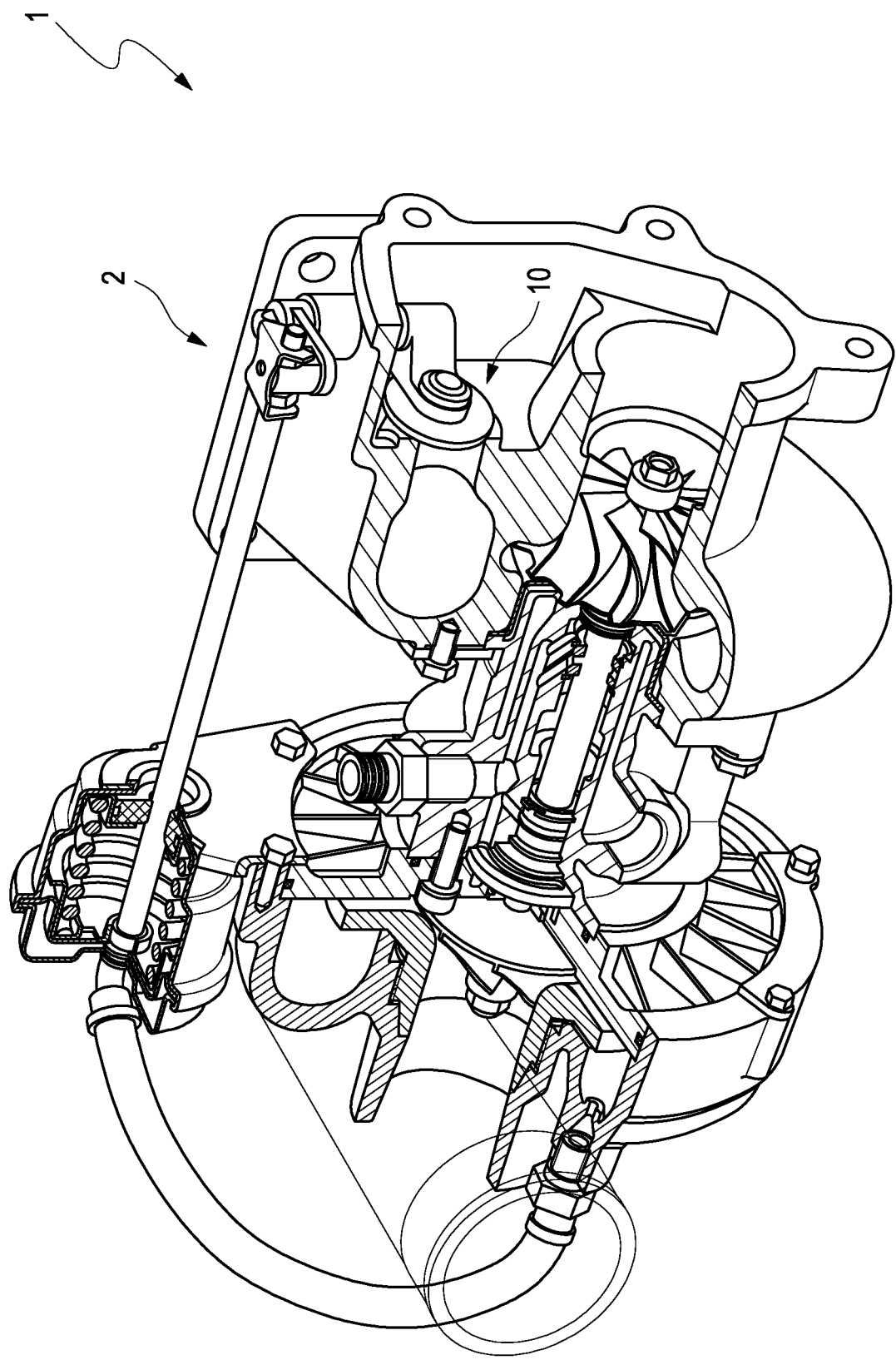
FIG. 12 shows a charging device with a turbine arrangement in which the valve assembly according to the invention may be used.

The invention additionally comprises a turbine arrangement for a charging device with at least one turbine housing, a turbine wheel arranged in the turbine housing, and a valve assembly 10 according to any one of the previously described embodiments. Spindle 100 is arranged in a through passage in the turbine housing. In particular, a sleeve may be provided between the spindle and the turbine housing for mounting spindle 100. A charging device 1 with a turbine arrangement 2 is shown in FIG. 12. The valve assembly according to the invention may be used in this type of turbine arrangement 2 and in combination with this type of charging device 1.

The turbine arrangement may also be provided for a charging device, wherein valve assembly 10 is part of a wastegate assembly. Alternatively, valve assembly 10 may be part of a bypass assembly. In this case, a second turbine housing and a second turbine wheel may be provided in the second turbine housing, for example, for a multi-stage exhaust gas turbocharger. The bypass assembly then functions for bypassing one of the turbine stages of the multi-stage exhaust gas turbocharger. The previously described valve assembly 10 may also correspondingly be part of a bypass between corresponding compressor stages of the multi-stage exhaust gas turbocharger.

The invention additionally comprises a charging device for an internal combustion engine with a turbine arrangement according to any one of the preceding embodiments. The charging device may additionally comprise an actuator for actuating valve assembly 10. The actuator may be, for example, a pneumatic actuator, a hydraulic actuator, or an electric actuator. The actuator may be, for example, connected via an actuator rod and a lever to an outer end of spindle 100.

Although the present invention has been described above and is defined in the attached claims, it should be understood that the invention may also be alternatively defined according to the following embodiments:

1. A valve assembly (10) for a charging device, in particular for a wastegate of an exhaust gas turbocharger, comprising
    a spindle (100);
    a lever arm (110) coupled to the spindle (100); and
    a valve unit (200),
    characterized in that the lever arm (110) has a connecting element (112) designed as at least partially spherical, and the valve unit (200) has an accommodation region (212) with at least one first conical accommodation surface (214) in which the connecting element (112) is arranged.
2. The valve assembly according to Embodiment 1, characterized in that the connecting element (112) is arranged in the accommodation region (212) in such a way that a first linear contact is formed between a spherical surface of the connecting element (112) and the first conical accommodation surface (214).
3. The valve assembly according to Embodiment 1 or Embodiment 2, characterized in that the accommodation region (212) has a second conical accommodation surface (216).
4. The valve assembly according to Embodiment 3, characterized in that the connecting element (112) is arranged in the accommodation region (212) in such a way that a second linear contact is formed between the spherical surface of the connecting element (112) and the second conical accommodation surface (216).
5. The valve assembly according to any one of the preceding embodiments, characterized in that the connecting element (112), designed as at least partially spherical, is designed to be at least partially hollow, in particular is configured in a C-shape.
6. The valve assembly according to any one of the preceding embodiments, characterized in that the valve unit (200) has a valve disk (210) and a cover (220), wherein the first conical accommodation surface (214) is designed in the valve disk (210) and, if provided, the second conical accommodation surface (216) is designed in the cover (220).
7. The valve assembly according to Embodiment 6, characterized in that the valve disk (210) has a projection (211) and the first conical accommodation surface (214) is designed as a surface inside of the projection (211).
8. The valve assembly according to Embodiment 7, characterized in that the projection (211) has a cylindrical outer surface and has a recess (211a) in a lateral wall, wherein the lever arm (110) is arranged at least partially in the recess (211a).
9. The valve assembly according to Embodiment 7 or Embodiment 8, characterized in that anti-rotation means are provided between spindle (100) or lever arm (110) and valve unit (200).
10. The valve assembly according to Embodiment 9, characterized in that the anti-rotation means are designed as at least one stop.
11. The valve assembly according to Embodiment 10, characterized in that the connecting element (112), designed as at least partially spherical, has a flattened portion (113) on at least one side, preferably on two or three sides, which form(s) a stop together with an inner wall (212a) of the projection (211).
12. The valve assembly according to Embodiment 10 or Embodiment 11, characterized in that the projection (211) has a recess (211b) and the connecting element (112), designed as at least partially spherical, has an extension (114), wherein the extension (114) is arranged in the recess (211b) and forms a stop together with corresponding lateral walls of the recess (211b).
13. The valve assembly according to any one of Embodiments 6 to 12, characterized in that the cover (220) has a cylindrical outer wall which has a recess, wherein the lever arm (110) is arranged at least partially in the recess.
14. The valve assembly according to any one of Embodiments 6 to 13, characterized in that the cover (220) has a centrally-arranged through passage (222).
15. The valve assembly according to any one of Embodiments 6 to 14, characterized in that the cover (220) is designed as a cast part.

16. The valve assembly according to any one of Embodiments 6 to 14, characterized in that the cover (220) is designed as a sheet metal part, in particular wherein the cover has spring-elastic properties.

17. The valve assembly according to Embodiment 16, characterized in that the cover (220) has a centrally-arranged through passage (222).

18. The valve assembly according to Embodiment 17, characterized in that the cover (220) has recesses (224) which define spring-elastic arms (226), wherein the arms (226) extend radially inward from an edge of the cover (220) in the direction of the through passage (222), in particular wherein three through eight arms are provided.

19. The valve assembly according to Embodiment 16, characterized in that a bottom (228) of the cover (220) has a solid part (229) and arms (226) machined into the bottom (228), wherein the arms (226) have spring-elastic properties.

20. The valve assembly according to any one of Embodiments 6 to 19, characterized in that the cover (220) and the valve disk (210) are welded to each other, are connected to each other via a press-fit connection, and/or are caulked to each other.

21. The valve assembly according to any one of Embodiments 1 to 5, characterized in that the valve unit (200) has a valve disk (210) and a closing element (230), wherein parts of the first and, if provided, the second conical accommodation surfaces (214, 216) are predominantly designed in the valve disk (210).

22. The valve assembly according to Embodiment 21, characterized in that one part of the first, and if provided, second conical accommodation surfaces (214, 216) is designed in the closing element (230).

23. The valve assembly according to Embodiment 22, characterized in that the second accommodation surface (216) is the one which is arranged farther away from a sealing surface (218) of the valve disk (210), and the part of the second accommodation surface (216) arranged in the closing element (230) is designed so that it presses the connecting element (112) into the first accommodation surface (214) during joining.

24. The valve assembly according to any one of Embodiments 21 to 23, characterized in that the valve disk (210) has a projection (211), wherein the accommodation region (212) is designed as a recess in the projection (211), and wherein the parts of the first and second conical accommodation surfaces (214, 216) are designed predominantly as wall surfaces of the recess.

25. The valve assembly according to Embodiment 24, characterized in that the projection (211) has a through passage (215), wherein the closing element (230) is arranged in the through passage (215).

26. The valve assembly according to Embodiment 24 or 25, characterized in that the accommodation region (212) has an opening (211*c*) in the axial direction, wherein the lever arm (110) extends through the opening (211*c*).

27. The valve assembly according to any one of Embodiments 21 to 26, characterized in that the connecting element (112) has a flattened portion (115) on a side facing the valve disk (210), said flattened portion forming a stop together with the valve disk (210).

28. The valve assembly according to any one of Embodiments 21 to 27, characterized in that the closing element (230) and the valve disk (210) are welded to each other, are connected to each other via a press-fit connection, and/or are caulked to each other, or wherein the closing element (230) and the valve disk (210) are screwed to each other.

29. The valve assembly according to any one of the preceding embodiments, characterized in that the spindle (100) and the lever arm (110), or the lever arm (110) and the connecting element (112), or the spindle (100), the lever arm (110), and the connecting element (112) are configured as one piece.

30. The valve assembly according to any one of Embodiments 1 to 28, characterized in that the spindle (100) and the lever arm (110) are configured as two separate components and are configured in such a way that the valve assembly (10) may be used as a valve assembly (10) that opens both to the left and also to the right.

31. A turbine arrangement for a charging device comprising at least one turbine housing;
a turbine wheel arranged in the turbine housing; and
a valve assembly (10) according to any one of the preceding embodiments.

32. The turbine arrangement according to Embodiment 31, characterized in that the spindle (100) is arranged in a through passage in the turbine housing, in particular wherein a sleeve is provided between spindle and turbine housing for mounting the spindle (100).

33. The turbine arrangement according to Embodiment 31 or Embodiment 32, characterized in that the valve assembly is part of a wastegate assembly.

34. The turbine arrangement according to Embodiment 31 or Embodiment 32, characterized in that the valve assembly is part of a bypass assembly.

35. A charging device for an internal combustion engine comprising a turbine arrangement according to any one of Embodiments 31 through 34.

The invention claimed is:

1. A valve assembly (10) for a charging device, in particular for a wastegate of an exhaust gas turbocharger, comprising
a spindle (100);
a lever arm (110) coupled to the spindle (100); and
a valve unit (200),
characterized in that the lever arm (110) has a connecting element (112), designed as at least partially spherical, and the valve unit (200) has an accommodation region (212) with at least one first conical accommodation surface (214) in which the connecting element (112) is arranged and characterized in that the accommodation region (212) has a second conical accommodation surface (216) and characterized in that the valve unit (200) has a valve disk (210) and a cover (220), wherein the first conical accommodation surface (214) is designed in the valve disk (210), and the second conical accommodation surface (216) is designed in the cover (220), and
wherein the cover (220) has a centrally arranged through passage (222) and recesses (224) which are distributed across a periphery of the through passage (222) and define arms (226).

2. The valve assembly according to claim 1, characterized in that the valve disk (210) has a projection (211) and the first conical accommodation surface (214) is designed as a surface inside of the projection (211).

3. The valve assembly according to claim 1, characterized in that anti-rotation means are provided between spindle (100) or lever arm (110) and valve unit (200).

4. The valve assembly according to claim 3, characterized in that the anti-rotation means are designed as at least one stop, wherein the connecting element (112), designed as at least partially spherical, has a flattened portion (113) on at least one side, said flattened portion(s) forming a stop together with an inner wall (212a) of the projection (211); or wherein the projection (211) has a recess (211b) and the connecting element (112), designed as at least partially spherical has an extension (114), wherein the extension (114) is arranged in the recess (211b) and forms a stop together with corresponding lateral walls of the recess (211b).

5. The valve assembly according to claim 4, wherein the connecting element (112), designed as at least partially spherical, has a flattened portion (113) on at least two or three sides.

6. The valve assembly according to claim 1, characterized in that the cover (220) is designed as a sheet metal part.

7. The valve assembly according to claim 6, wherein the cover (220) has spring-elastic properties.

8. A turbine arrangement for a charging device comprising at least one turbine housing;
a turbine wheel arranged in the turbine housing; and
a valve assembly (10) according to claim 1.

9. A charging device for an internal combustion engine comprising a turbine arrangement according to claim 8.

10. The valve assembly according to claim 1, characterized in that the valve unit (200) has a valve disk (210) and a closing element (230), wherein parts of the first and the second conical accommodation surfaces (214, 216) are designed predominantly in the valve disk (210).

11. The valve assembly according to claim 10, characterized in that one part of the first and second conical accommodation surfaces (214, 216) is designed in the closing element (230).

12. The valve assembly according to claim 1, characterized in that the valve unit (200) has a valve disk (210) and a closing element (230), wherein parts of the first conical accommodation surfaces (214) are designed predominantly in the valve disk (210).

13. The valve assembly according to claim 12, characterized in that the connecting element (112) has a flattened portion (115) on a side facing the valve disk (210), said flattened portion forming a stop together with the valve disk (210).

14. The valve assembly according to claim 12, characterized in that one part of the first conical accommodation surfaces (214) is designed in the closing element (230).

15. The valve assembly according to claim 14, characterized in that the second accommodation surface (216) is the one which is arranged farther away from a sealing surface (218) of the valve disk (210), and the part of the second accommodation surface (216) arranged in the closing element (230) is designed so that it presses the connecting element (112) into the first accommodation surface (214) during joining.

16. The valve assembly according to claim 12, characterized in that the valve disk (210) has a projection (211), wherein the accommodation region (212) is designed as a recess in the projection (211), and wherein the parts of the first and second conical accommodation surfaces (214, 216) are designed predominantly as wall surfaces of the recess.

17. The valve assembly according to claim 16, characterized in that the accommodation region (212) has an opening (211c) in the axial direction, wherein the lever arm (110) extends through the opening (211c).

* * * * *